US007590950B2

(12) United States Patent
Collins et al.

(10) Patent No.: US 7,590,950 B2
(45) Date of Patent: Sep. 15, 2009

(54) MOBILE LOTTERY TERMINAL INCLUDING FEATURES FACILITATING USE BY VISUALLY IMPAIRED TICKET AGENTS

(75) Inventors: Christopher Collins, Lincoln, RI (US); Kurt Businger, Warwick, RI (US); Scott Hultzman, Putnam, CT (US); Kevin Romano, Barcelona (ES); Dana Letiecq, Millbury, MA (US); Angel Sierra Calvo, Madrid (ES)

(73) Assignees: GTech Rhode Island Corporation, Providence, RI (US); Organización National De Ciegos Españoles, Madrid (ES)

( * ) Notice: Subject to any disclaimer, the term of this patent is extended or adjusted under 35 U.S.C. 154(b) by 757 days.

(21) Appl. No.: 10/453,772

(22) Filed: Jun. 2, 2003

(65) Prior Publication Data
US 2004/0054623 A1 Mar. 18, 2004

Related U.S. Application Data

(60) Provisional application No. 60/386,506, filed on Jun. 5, 2002, provisional application No. 60/435,434, filed on Dec. 20, 2002.

(51) Int. Cl.
G06F 3/14 (2006.01)
G06F 3/00 (2006.01)
(52) U.S. Cl. ...................... 715/864; 715/865
(58) Field of Classification Search ................. 715/864, 715/865; 463/17, 19, 40–42; 235/383
See application file for complete search history.

(56) References Cited

U.S. PATENT DOCUMENTS

| 4,764,666 | A |   | 8/1988 | Bergeron |
| 4,882,473 | A |   | 11/1989 | Bergeron et al. |
| 5,239,165 | A |   | 8/1993 | Novak |
| 5,326,959 | A |   | 7/1994 | Perazza |
| 5,351,970 | A | * | 10/1994 | Fioretti ........................ 463/19 |
| 5,453,600 | A |   | 9/1995 | Swartz |
| 5,818,026 | A |   | 10/1998 | Melling et al. |
| 6,842,795 | B2 | * | 1/2005 | Keller ........................ 715/864 |
| 6,899,621 | B2 | * | 5/2005 | Behm et al. .................... 463/17 |
| 7,052,394 | B2 | * | 5/2006 | Walker et al. .................. 463/17 |
| 7,146,577 | B2 | * | 12/2006 | Hoffman ..................... 715/865 |
| 2001/0052083 | A1 |   | 12/2001 | Willins et al. |
| 2003/0006998 | A1 | * | 1/2003 | Kumar ........................ 345/700 |

FOREIGN PATENT DOCUMENTS

WO  PCT/IB03/02129  5/2003

OTHER PUBLICATIONS

U.S. Appl. No. 60/386,506, filed Jun. 5, 2002, Collins et al.
U.S. Appl. No. 60/435,434, filed Dec. 20, 2002, Collins et al.

* cited by examiner

*Primary Examiner*—Weilun Lo
*Assistant Examiner*—Truc T Chuong
(74) *Attorney, Agent, or Firm*—K&L Gates LLP (57) ABSTRACT

A mobile lottery terminal is disclosed. The mobile lottery terminal includes a processor. The mobile lottery terminal may include a Braille keypad in communication with the processor. The mobile lottery terminal may also include a customer information input device in communication with the processor and operable to input information indicative of a customer-selected lottery number. A system incorporating mobile lottery terminals and method of vending lottery tickets using mobile lottery terminals is also disclosed.

43 Claims, 5 Drawing Sheets

Figure 1
Example Lottery System Architecture

Figure 2
Example Terminal Architecture

Figure 3
System Memory

Figure 4

Figure 5
Example Ticket Purchase Process

MOBILE LOTTERY TERMINAL INCLUDING FEATURES FACILITATING USE BY VISUALLY IMPAIRED TICKET AGENTS

PRIORITY CLAIM AND RELATED APPLICATIONS

This application claims priority from previously filed U.S. provisional patent applications 60/386,506 filed Jun. 5, 2002 and 60/435,434 filed Dec. 20, 2002. Both of these provisional applications are incorporated by reference in the present application in their entirety. A related U.S. utility application, Method and Device for Data Input, naming Christopher Collins et al as inventors, is being filed concurrently with the present application.

BACKGROUND INFORMATION

Lotteries are common throughout the world. The sale of lottery tickets is an important source of government revenue in many jurisdictions.

Future draw lotteries typically involve the sale of a chance in a future draw game of chance to an individual. The chance is typically represented by a physical ticket sold to the lottery customer. The ticket may be printed on paper or another media. The ticket may include one or more lottery numbers, either selected by the customer, selected by a system that generates the ticket, or pre-printed on the ticket. At a prespecified future time, a number or group of numbers is randomly selected from the pool of possible numbers, e.g., by physically drawing a random number, or by computer random number generation. Tickets with numbers that match the drawn numbers are winners, and are eligible to be redeemed for a prize. The rules for determining a match and the size of the prize for a particular match may vary by the particular game or jurisdiction. For example, multiple lottery numbers may be on the card, and they may need to match the drawn numbers in any order for a small prize, and in the exact order drawn for a larger jackpot prize. The size of the prize may be predetermined, e.g., a fixed prize, or pari-mutual, e.g., all winning tickets share equally in a predefined portion of the total amount spent to buy chances in the drawing.

In some jurisdictions lottery ticket selling agents are mobile; they do not sell tickets from a particular location, but instead may travel around selling tickets. In these jurisdictions, lottery tickets are typically preprinted with lottery numbers. The ticket selling agents receive an inventory of tickets with pre-printed lottery numbers and travel around selling them. Prior to the drawing, the unsold tickets are returned for a credit. Lottery customers can only select their own desired "lucky" lottery number to the extent that a ticket with that lottery number is found in a particular ticket seller's inventory. The sale of a future-draw lottery ticket with customer-selected lottery numbers, although commonly available in jurisdictions with fixed location ticket sellers having sophisticated lottery terminals, may not be available in jurisdictions with mobile lottery ticket selling agents, or at minimum are not sold by traveling ticket sellers.

Moreover, in some jurisdictions lottery ticket selling agents are predominantly visually impaired. In some jurisdictions, the lottery is run to benefit the visually impaired, or research and services for the visually repaired. Conventional prior art lottery terminals in addition to being tied to a fixed location, are not configured to be used by visually impaired ticket agents.

DETAILED DESCRIPTION OF EXAMPLE EMBODIMENTS

Figure 1:
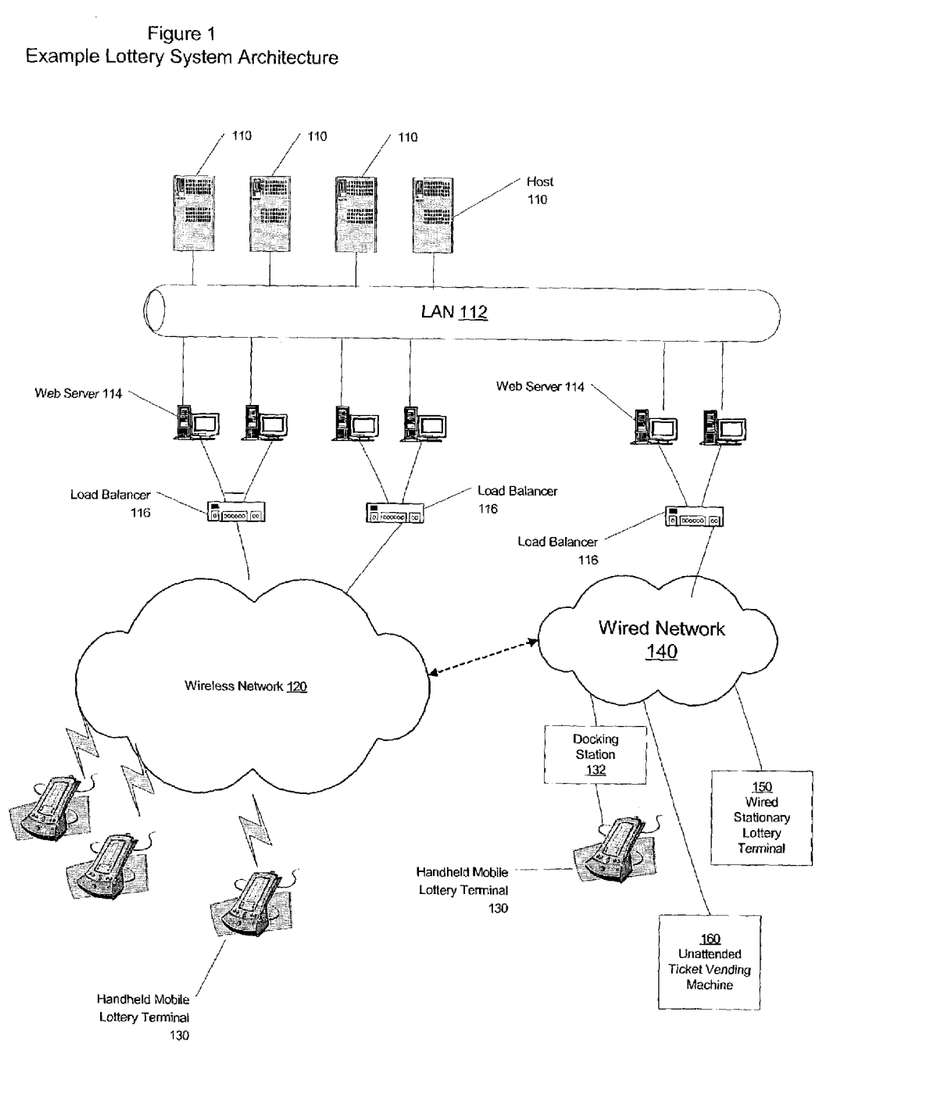
FIG. 1 illustrates an example lottery system architecture, according to an example embodiment of the present invention.

FIG. 1 illustrates an example lottery system architecture, according to an example embodiment of the present invention. The hosts 110 act as a central servers for processing lottery transactions of all types. One or more hosts 110 may provide and control access to a lottery database that contains information about ticket sales and redemptions. The hosts 110 may receive and process transactions, e.g., ticket purchases, credit card authorization for credit card purchases, ticket redemptions, etc. It will be appreciated that the databases contained on the hosts 110 may be stored in any conventional fashion, e.g., distributed across multiple hosts, stored on a single large host, etc. The hosts 110 may also provide other types of services, e.g., administrative access for maintenance of the databases.

The immediate interface to and between the hosts may be a LAN 112. Connected to the LAN 112 may be one or more Web Servers 114 which may be configured to process communications from users of the lottery system over a lottery intranet, or other network. The Web Servers 114 may be connected to Load Balancers 116 which may be configured to insure requests for servicing transactions are balanced over the various web servers and hosts. The Load Balancers 116 may also be configured to provide throttling if the system is overloaded. The Load Balancers 116 may connect the web servers 114 with lottery terminals via the lottery intranet. The lottery intranet may include both a wireless network 120 and a wired network 140. It will be appreciated that other client-server architectures may be employed, e.g., the functions of the web server and database may be combined on a single system, various systems of primary and hot backups may be employed, etc.

Connected to the wireless network may be mobile lottery terminals, e.g., the handheld lottery terminal 130. These terminals may be connected to the hosts 110 via the web servers 112 using conventional data exchange protocols, such as TCP/IP or UDP/IP running over an ordinary wireless network such as GSM or GPRS. The terminals may be configured to run by default over a primary network, such as GPRS, which is more cost-effective, and use more expensive GSM only as a back-up when GPRS is not available, thus improving availability Connected to the wired network 140 may be more conventional wired lottery terminals 150. Traffic from the wireless network may also pass through the wired network to reach the load balancers and web servers, as shown by the dotted arrow in FIG. 1. The wired network 140 may include conventional dial-up telephone lines, CATV based internet, DSL, a dedicated hard-wired network, or any other conventional wired network.

Also connected to the wired network 140 may be unattended lottery terminals 160. The unattended terminals 160 may include dedicated lottery ticket vending machines, as well as other types of terminals which may be upgraded to vend lottery tickets, e.g., automated teller machines, informational kiosks, transit ticket vending machines, etc.

Mobile lottery terminals 130 may also be connected to the hosts 110 via the wired network 140 through the use of docking stations 132. The docking station 132 may serve as a power source and re-charger, as well as providing wired network connectivity.

Figure 2:
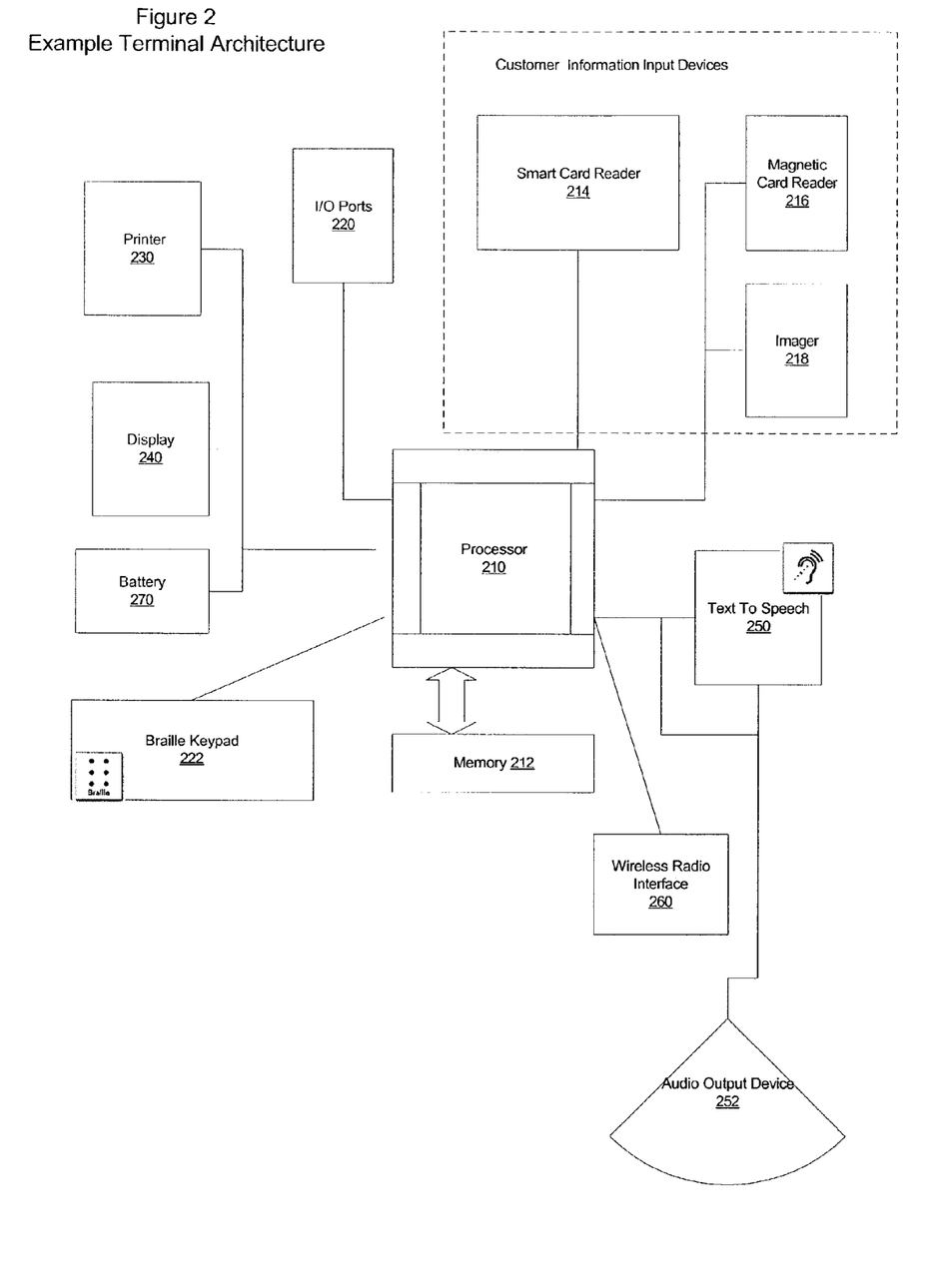
FIG. 2 illustrates the architecture of an example mobile lottery terminal, according to an example embodiment of the present invention.

FIG. 2 illustrates the architecture of an example mobile lottery terminal, according to an example embodiment of the present invention. The example mobile lottery terminal may be provided using a mobile point of sale hardware terminal platform, e.g., the Elite series of portable wireless EFT terminal hardware provided by Ingenico Corporation of 9 Quai De Dion Bout, Puteaux 92816 France, or similar devices.

The example mobile lottery terminal 200 may include a processor 210. The processor 210 may be a 32-bit ARM RISC-based embedded processor. The processor 210 may be configured to control the operation of the components of the terminal 200, and to run software which provides lottery terminal functionality both to the lottery sales agent and the customer. It will be appreciated that a larger faster processor, such as a 32-bit ARM, versus a smaller lower cost and lower power 16-bit processor, may allow the use of more complex encryption and security algorithms, as well as providing more processing power for greater flexibility.

The example mobile lottery terminal 210 may also include a memory 212. The memory 212 may include one or more types of memory devices, including read-only and RAM memory of various types, including conventional DRAM, flash memory, magnetic or optical disks, flash memory, etc. It will be appreciated that the amount of memory provided is a tradeoff between power use and functionality. Preferably a minimum of 4 Mbytes flash EPROM, or RAM backed-up by lithium battery, and 1 Mbytes RAM may be provided, although 8-12 megabytes may be preferable depending on the type of gaming applications provided on the terminal.

The example mobile lottery terminal 210 may also include various input and output devices. A subset of the input and output devices may be customer information input devices configured for the input of information from a lottery ticket customer, either by direct entry by the customer, or by entry of the information from some media in the customer's possession. The customer information may include customer identification information, demographic information about the customer, the customer's play history, the customer's choices for lottery ticket purchases such as the game tickets desired and the desired lottery numbers, as well as payment information enabling the customer to conduct a cashless transaction for the purchase of a lottery ticket.

As one form of customer information input device, the mobile lottery terminal 210 may include a smart card reader 214. It will be appreciated that the smart card 214 reader may also be used for other purposes besides the input of customer information. The smart card reader 214 may function per ISO 7816 and EMV guideline standards, e.g. EMV 4.0 level 1. In many jurisdictions smart cards may be used for conventional credit cards, bank cards, or personal ID cards. Smart cards may also be used specifically as a lottery "loyalty" card, e.g., to store personal information about a lottery player such as their demographic information, playing history, their favorite numbers, etc. Enabling the use of a smart card or other electronic payment system has the advantage of reducing the amount of cash that must be handled by a mobile ticket selling agent. The use of smart card for lottery application has previously been described in U.S. Pat. Nos. 4,882,473 and 4,764,666.

As a second form of customer information input device, the example mobile lottery terminal 210 may also include a magnetic card reader 216 for reading conventional magnetic stripe cards. For example a conventional double track ½ or ⅔ magnetic stripe reader my be included. It will be appreciated that the magnetic card reader may also be used for other input output purposes besides customer information input.

With either a smart card or a bank card reader, the terminal may be configured to accept cashless payments from lottery customers. These payments may include bank debit cards, credit cards, and pre-stored value cards of various types. If needed as part of the transaction, the customer may enter a personal identifier using the keypad, in a manner similar to other types of point of sale transactions.

As a third type of customer information input device, the example mobile lottery terminal 210 may also include an imager 218 for reading lottery playslips or other inputs. It will be appreciated that the imager may also be used for purposes other than the input of customer information. The imager 218 may be a conventional bar code scanner, either integrally housed in the terminal body, or attached as a peripheral device such as a bar code scanning wand. The imager 218 may be used with the playslip and playslip reading method described in U.S. Provisional Patent Application No. 60/386,506 filed Jun. 5, 2002. This method allows a lottery ticket customer to mark a card with their lottery number selections, and then have the slip scanned with a bar code reader to input their lottery number selections to the lottery terminal. Alternatively, the imager may be a digital camera. The digital camera may be used to take a scan or photograph of the entire playslip. Various image processing techniques may then be applied to the image of the playslip in order to extract the customer information.

The example mobile lottery terminal 210 may also include conventional I/O ports 220, such as USB, RS-232, PCMCIA, or other types of I/O connections. These ports may include a connection for a docking station, to allow the mobile lottery terminal to connect with a host via a conventional wired connection. It will be appreciated that other devices for the input of customer information may be connected to these ports, e.g., when the terminal is docked in a kiosk docking station. The conventional I/O ports may permit the expansion of or addition of peripherals to the mobile lottery terminal 210. The conventional I/O ports may be configured to allow the mobile lottery terminal 210 to upload information on a bulk basis, e.g., to produce a daily transaction record, or to download new software and applications, e.g., software supporting new types of lottery tickets.

The example mobile lottery terminal 210 may also include an infrared interface, for interfacing with other devices, such as personal digital assistants (PDA) that have such interfaces. This would allow a lottery customer to store personal information, such as a "lottery number" pick, as well as payment information if desired, and transmit it to the lottery terminal directly from a PDA or other infrared capable device. An infrared interface may also provide a standard way to interface to other wireless peripherals, such as external printers or readers.

The example mobile lottery terminal 210 may also include a keypad 222. The keypad is the primary device for the input of information by the ticket seller in the example embodiment. The keypad 222 may be an alphanumeric mobile phone type keyboard with function keys. For the use of a visually impaired sales agent, the keypad 222 may have keys which are tactilely distinct. This may be accomplished in different ways. For example, different functional keys may have distinct shapes that are easily recognizable by a visually impaired user with training and experience using the device. Alternatively, Braille keys may be provided for the keypad. It will be appreciated that other standard interfaces for the visually impaired may be used, e.g., depending on the local standard used for other applications, such as cellular phones. Given the intended use of the lottery terminal 210, which includes outdoor use in many seasons, a sealed type of keypad is preferable. It will be appreciated that other devices for the input of information by the ticket seller may also be provided, e.g., the use of a microphone coupled with voice recognition device.

The example mobile lottery terminal 210 may also include a printer 230. The printer may be configured to print lottery tickets, receipts, transaction logs, or other items. A conventional high security thermal printer such as those conventionally used in lottery applications may be employed. The printer 230 has the capability to print barcodes, preferably supported by the printers firmware, so that the processor is not burdened by generating barcodes. Because lotteries are located in many countries, a printer that supports a range of international character sets is also preferable. Experience has indicated that a minimum printer resolution of at least 200 dpi is necessary for mobile lottery ticket applications. The printer 230 also preferably includes a draft mode, which allows lower resolution printing with lower power consumption.

The printer 230 may also have automatic sensing of various problems, such as jams, low paper, paper out, incomplete printing, or out of toner. The printer 230 may be configured to report these problems to the processor, which may be configured to cancel the ticket, both by physically marking it (e.g., printing "VOID"), and by recording and reporting that the partially printed ticket has been cancelled. The detection and reporting of printing problems be important because tickets may have large potential economic value, sometimes several million dollars. The automated detection of printing problems may also be preferable in light of the fact the mobile lottery terminal 200 is intended for use by a visually impaired operator, who will not be able to visually detect a printer problem.

The printer 230 may also include a top of form sensor. The use of a top of form sensor allows the use of pre-printed logos and images on printer stock, reducing the amount of printing that must be performed by the terminal, and thus reducing power consumption.

The example mobile lottery terminal 210 may also include a display 240. The display 240 is included, even for a terminal intended for visually impaired users, because not all users may be visually impaired. Moreover, the display may also be used to display information to a lottery customer, as opposed to the ticket agent. A conventional LCD display may be employed.

The example mobile lottery terminal 210 may also include a text-to-speech conversion device 250. This device may convert from conventional text prompts or outputs to speech signals which may be output through an audio output device 252. For a visually impaired operator all prompts and outputs may be converted to speech. For operators who are not visually impaired, not all prompts may need to be converted to speech, although a subset of prompts may still be converted to speech, depending on the needs of the user and the type of prompt. It will be appreciated that the text-to-speech output device, rather than being a physically separate component, may also be included as part of the processor, the audio output device 252, or some other component. For example, text-to-speech conversion may be provided in software in the processor, which although not the preferable method of providing text-to-speech conversion today, may improve as processor power continues to increase. The audio output device 252 may also be configured to provide other sounds besides speech interpretation of prompts. For example, the audio output device 252 may provide a range of distinct tones (e.g., distinctly different frequencies) each associated with one of the keys on the device. This allows visually impaired operator to more accurately operate the device using the keypad and to more easily recognize their own input mistakes. For example, the tones associated with the number keys may be the same pitches as are used in the standard DTMF tones associated with the keys of a telephone. These standard pitches are often familiar to visually impaired telephone users. It will be appreciated that other approaches to producing distinct sounds may be provided, e.g., the sound associated with the key may be a spoken name of the key The audio output device 252 may also provide buzzers or other distinct sounds associated with various operating conditions, e.g., printer problems. The audio output device 252 also supports the regulation of volume, under control of the both the user and the processor. Many retailers use handheld terminals in busy streetside settings with loud automotive and pedestrian traffic. Others use their terminal inside of kiosks and have less sound disturbance. An earpiece or headphone and interface for the earpiece of headphone may also be provided. This may facilitate the use of sound on streets with a large amount of background noise.

The example mobile lottery terminal may also include a wireless radio interface 260. The wireless radio interface may include an antenna, radio transmitter and receiver, signal processing capability, and other features needed to provide a wireless radio interface.

The example mobile lottery terminal may also include a battery 270, as well as facility for charging the battery, e.g., when docked at a docking station. Sufficient batteries may be provided to provide two hours of active use, or ten hours of "standby use". The amount of batteries required may be tailored depending on the number of tickets sold by a typical retailer during an undocked period. The battery pack is removable, to allow it to be changed while in the field by a visually impaired user. Standard batteries (AA) are difficult for visually impaired users to remove and replace in the real world environment retail environment, so batteries with larger modular-type plug ins may be preferable. A separate backup battery may be provided to maintain the system clock, and other information that is important to maintain in memory if the main battery is exhausted or is being changed.

It will be appreciated that the example mobile lottery terminal 210, may also include other components and perform other functions. For example, using a similar architecture, the example mobile lottery terminal 210 may be used to sell and redeem conventional pre-printed lottery tickets, such as instant-win lottery tickets, or conventional pre-printed coupons for future-draw lottery tickets.

The example mobile lottery terminal 210 may also include one or more alarm buttons. These buttons could be used to cause the terminal to emit a loud alarm signal when it is tampered with, or when a panic button was pressed. The terminal may also be configured to transmit a message to the host that the alarm button has been activated, or that the machine has been tampered with. This message can then be handled appropriately, e.g., a message that the machine had been tampered with could cause the flagging and recall of tickets sold from the tampered with machine, while the activation of the alarm button could be communicated to local public safety officials.

The example mobile lottery terminal 210 could also include location hardware, such as a conventional Global Positioning System. This equipment could be used to help a visually impaired operator navigate, for example, by supplying an oral indication of present location, or by providing directions from the current position to a desired location. The position information may also be reported with alarm information, e.g., when an alarm button was pressed the current position could be reported to public safety authorities The location information could also be used for other purposes, e.g., to track and report the location tickets are sold for marketing and planning purposes.

The physical design of the example mobile lottery terminal 210 is based on providing a sealed molded plastic housing. It will be appreciated that a sealed device is preferable because of the potential for outdoor use of the device in different climactic conditions. The processor and other electronic components may be contained in the housing. Interfaces and I/O devices are preferable retained by the housing, rather than loose attachments. For example, the keypad is may be a sealed keypad that is retained by the housing, rather than an externally attached keyboard.

Portability is a useful aspect of the example mobile lottery terminal 210. In some jurisdictions, retailers are currently selling lottery tickets while traveling around, but do not have a fixed retail location Those retailers who do have a fixed location (e.g., a kiosk) often close the kiosk during the day (lunchtime, etc . . . ) and sell tickets in the street. Accordingly the mobile lottery terminal the device is dimensioned to be easily held in one hand, preferably 10 cm or less in width, 21 cm or less in length, and 5 cm or less in height. For the same reason, the device preferably weighs less than 1 kg. An alternative embodiment of the device may be larger, and may have a tripod or other portable means of supporting the device, similar to the small terminals used by stenographers.

Street retailers may carry the handheld terminal for several hours before resting. Thus, even a lightweight device will become a burden after several hours. For this reason, a mounting device is included to facilitate the mounting of the terminal. The mounting device may be located on the terminal in a position that does not interfere with the connection of the terminal to any peripheral (such as a docking station), e.g., on the end of the device opposite the location of the I/O ports. Alternatively., mounting hardware may be removable to facilitate docking. It will be appreciated that many different possible mounting configurations and types of hardware may be employed. For example, Velcro, clips, rings, etc may be attached to the housing of the terminal and used to attach the terminal to a belt or shoulder strap. Alternatively, loops through which a belt may be threaded may be attached or integrally molded as part of the housing. Other forms of attachment may also be employed, e.g., the device may be held in a partially enclosed pouch on a belt or shoulder strap that still leaves the keypad, customer input devices, and printer accessible.

The example mobile lottery terminal may also include a range of security features. The terminal is contained in a sealed housing to prevent tampering. The system may also include a digital signature system. The inclusion of a digital signature system ensures the operator in charge of the terminal is perfectly identified at all times and will not be able to deny access or any operation carried on the terminal. The example terminal may also include at least one SAM security module, e.g., an ISO 7816-2/3 compliant SAM chip. This card may be internal to the sealed device, and may be a changeable chip card which includes conventional encoding algorithms and security keys that can be used to uniquely identify the device.

Figure 3:
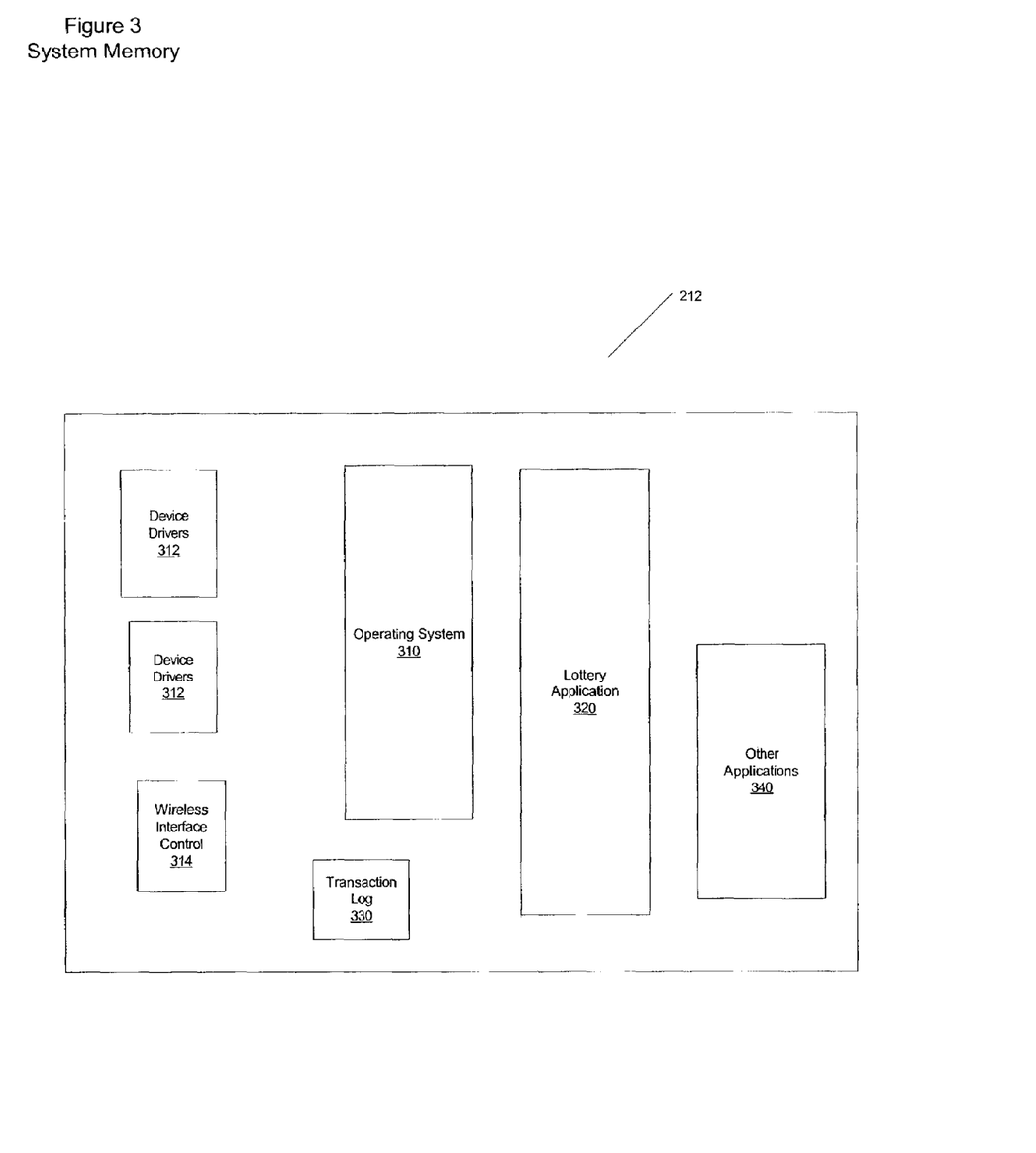
FIG. 3 illustrates an example memory for the example mobile lottery terminal, according to an example embodiment for of the present invention.

FIG. 3 illustrates an example memory for the example mobile lottery terminal 210, according to an example embodiment for of the present invention. The memory may be configured to store the operating system 310, which may control the operation of the processor and other devices, and provide interfaces for other application software with the underlying hardware. Included either as part of the operating system, or as separate software under the control of the operating system may be various types of device drivers 312. Similarly, software or firmware for the control and operation of the terminals interface with the wireless network 314 may be provided. This may include, for example, signal processing software. Routines may also be provided that enable the terminal to switch from a primary wireless network to a back wireless network when the primary wireless network is not operating.

Lottery applications 320 may be provided. The lottery application software may include various lottery functions such as tickets sales, ticket redemptions, accounting, etc.

A "write-only-once" memory may also be included, to allow the creation of an auditable record for terminal transactions. This memory could be provided with a write-once optical device, or with a secure stable memory device, that can only be altered with the use of an encryption key not available to the ticket agent. Stored in this memory may be a transaction log 330, and other accounting information which may need to be preserved for accounting and audit purposes.

It will be appreciated that other applications 340 may also be provided in either software or firmware. These other applications may include other kiosk or terminal based applications which are useful for businesses that could be operated by lottery ticket sellers, e.g., software for the sale of transit tickets, event tickets, etc. Provision may also be provided for sale redemption of instant lottery tickets form the terminal, including software for managing an inventory of pre-printed instant win tickets.

Figure 4:
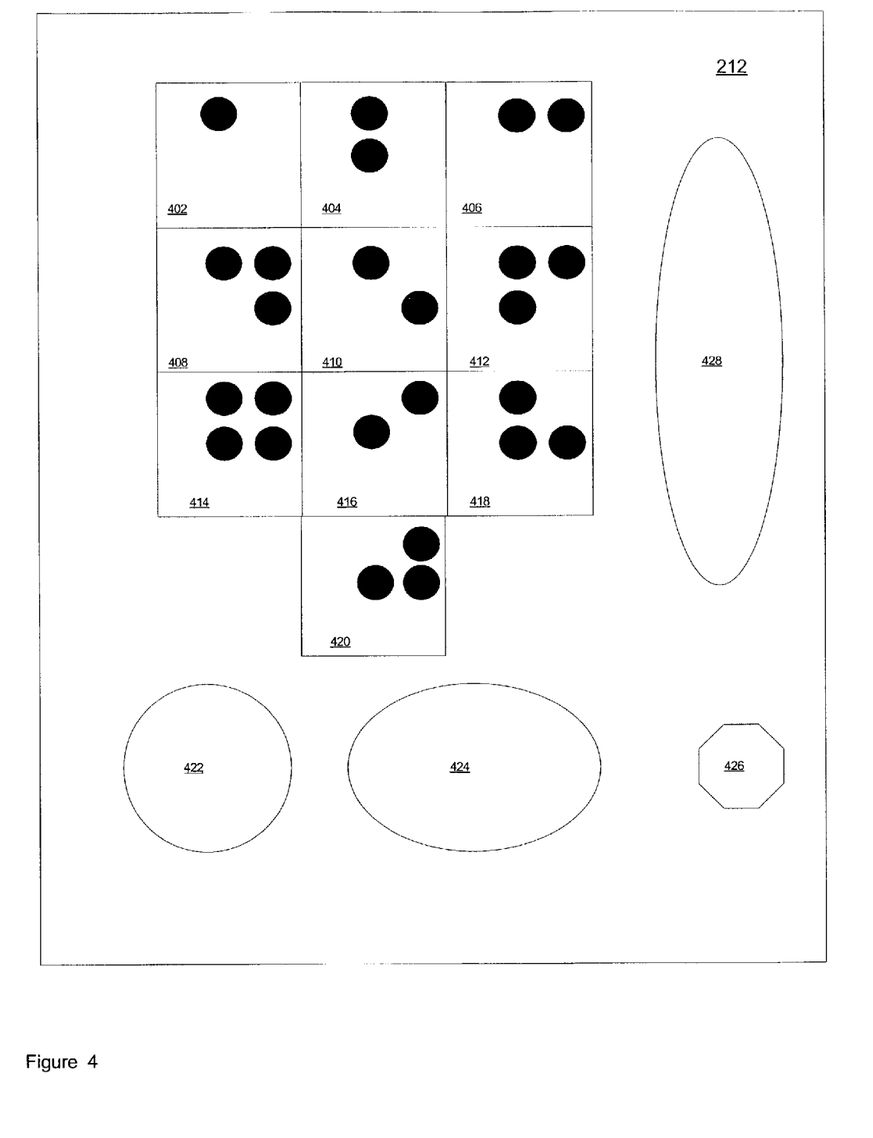
FIG. 4 illustrates an example keypad, according to an example embodiment of the present invention.

FIG. 4 illustrates an example keypad, according to an example embodiment of the present invention. This keypad 212 may be used in the example mobile lottery terminal, described above. The keypad includes 10 numeric keys 402, 404, 406, 408, 410, 412, 414, 416, 418, and 420. These keys represent, respectively the digits 1-9 and 0. Each key has a Braille symbol on it for the letters a-j. In Braille, the numbers are made by adding an additional symbol in front of the letters a-j. It will be appreciated that this symbol could also be included on the keys, or could be omitted as shown, depending on user preferences. The Braille may be integrally molded into the key, added as an applique, or may be included on the key in any other manner that produces a readable durable symbol. Labels on the keys may also be raised letters, or other tactilely distinct symbols that are recognizable by the visually impaired. Several function keys 422, 424, 426, and 428 are provided. These function keys have distinctive shapes to allow them to be easily recognized. It will be appreciated that instead of, or in addition to the distinctive shapes, other approaches to providing tactilely distinct function keys may be provided, e.g., by providing Braille labels on the function keys, providing them with distinct textures, etc. It will also be appreciated that the structure of the keypad may be varied to accommodate user preference, standards in different regions or languages, etc.

Figure 5:
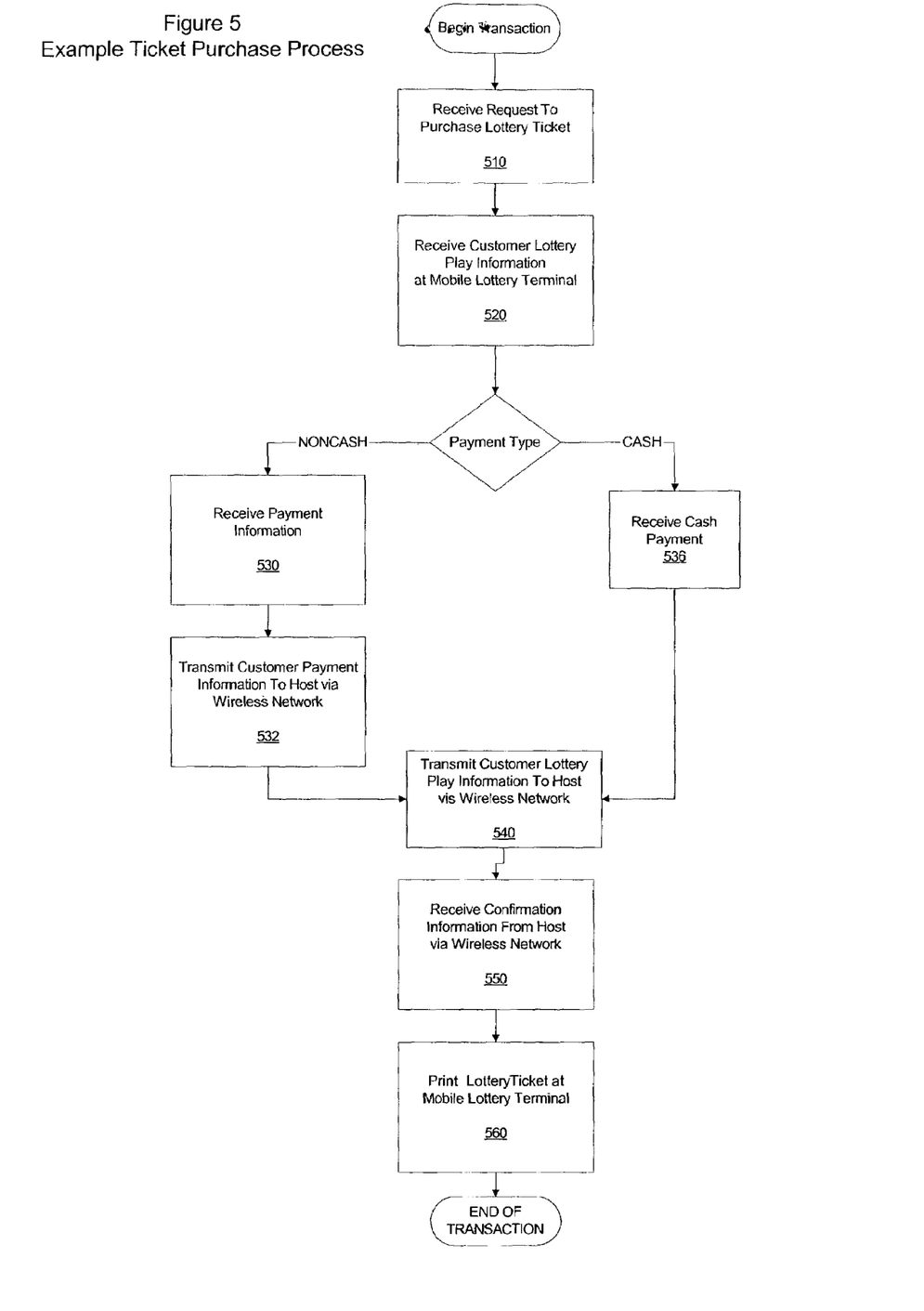
FIG. 5 illustrates an example procedure for vending lottery tickets, according to an example embodiment of the present invention.

FIG. 5 illustrates an example procedure for vending lottery tickets, according to an example embodiment of the present invention. The example procedure may be performed using the example mobile lottery terminal described above, or may be performed with other equipment. It will be appreciated that additional operations may be added to the example procedure or the order of operations may be varied.

In 510, a request to purchase a lottery ticket may be received. The request may be received in a variety of ways. For example, a customer may ask an agent to purchase a ticket, and the agent may enter information into a lottery terminal. Alternatively, the customer may enter information at an unattended lottery terminal, or may enter information directly into an attended terminal.

In 520, information about the ticket the customer wishes to purchase may be received. This information may include the value of the ticket, the number of tickets the customer wishes to purchase, the type of lottery game the customer wishes to purchase chances for, and the lottery numbers the customer wishes to play. The information may be communicated by the customer to an agent, who then enters the information. Alternatively, the information may be entered directly by the customer, e.g., by pressing buttons or typing on a keypad. The information may also be pre-stored, e.g., on a mag-stripe or smart card, which the customer may provide to supply the information. The information on the magnetic stripe or smart card may also indicate a location to find the relevant customer information, e.g., the card may supply a customer identifier, which allows the look-up of customer information in a database on the terminal or at a lottery central server. The customer may also complete a play slip, e.g., by writing on a bar coded play slip such as the one disclosed in U.S. Provisional Patent Application 60/386,506 filed Jun. 5, 2002. The customer's information may then be input from the play slip, e.g., by scanning or imaging the play slip.

If the customer is making a cashless purchase, the example procedure continues with 530, where payment or payment information may be received from the customer. The customer may present a credit card, debit card, or pre-stored value card that may be read by a lottery terminal input device of the appropriate type. In 532, the customer payment information may then be transmitted to the lottery host for completion of a conventional point of sale transaction. The information may be transmitted via a wireless connection. Conventional encryption techniques, for example RSA or DES encryption may be employed to ensure security of the transaction. Digital signature information for the terminal, the agent, and the customer may all be included, in order to prevent disavowal of the transaction. The host computer may then conduct a debit or credit card transaction, e.g., by communicating with bank or credit card network. This information may use standard Electronic Funds Transfer (EFT) and POS (point of sale) protocols, such as those used by Visa or various bank networks. It will be appreciated that alternatively, the lottery terminal may directly complete a point of sale transaction with a banking or credit database without going through the lottery host. The example procedure then continues with 540.

If the customer pays cash, the example procedure continues with 536. The customer may pay cash to an agent, who then enters the fact that a cash payment was made. The example procedure then continues with 540.

In 540, information may be communicated with a lottery host computer, for example via a wireless connection. Again conventional encryption and other security measures may be employed. Digital signature information for the terminal, the agent, and the customer may all be included, in order to prevent disavowal of the transaction. This may include information about the customer's lottery number selection and other information about the game the customer wishes to play, as well as other information, e.g., customer demographic information or membership in a loyalty club.

In 550, if the credit or debit transaction has been successful or cash was paid, the host may transmit information via the wireless network indicating that a lottery ticket should be printed for the lottery customer. This information may include a confirmation or authentication code that will be printed on the ticket. This code may uniquely identify the ticket, and allow it to be authenticated should the ticket later be presented for redemption. Information transmitted from the host may also include a customer-selected lottery number, if that information was stored on the host rather than obtained from the customer. Information transmitted from the host may also include a randomly selected lottery number, e.g., if the customer chooses to have the system pick the lottery number (often known as a Quick Pick). It will be appreciated that other information may also be transmitted to the terminal from the host, e.g., marketing messages to be printed on the ticket.

In 560, a lottery ticket containing the authentication code and the customer-selected lottery number may be printed, e.g., by the mobile lottery terminal. It will be appreciated that other forms of providing a receipt for a ticket may also be employed, e.g., authentication and customer selection information may be stored on a customers smart card, rather than printed on a ticket.

MODIFICATIONS

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A mobile lottery terminal for use by a visually impaired ticket agent, comprising:
a processor,
a keypad in communication with the processor and including a plurality of keys, at least a subset of the plurality of keys having Braille identifiers;
a customer information input device in communication with the processor and configured to input information indicative of a customer-selected lottery number, wherein the customer information input device includes a lottery play slip reader including a bar code scanner;
a wireless communication input-output device in communication with the processor and configured to provide wireless communications between the mobile lottery terminal and a central lottery server;
a lottery ticket printer in communication with the processor; and
a housing dimensioned to be held in one hand, the housing containing the processor, containing the lottery ticket printer, and retaining the keypad, wherein the customer information input device is at least one of: retained by the housing, or attached to the housing.

2. The mobile lottery terminal for use by a visually impaired ticket agent of claim 1, further comprising:
a magnetic stripe card reader in communication with the processor.

3. The mobile lottery terminal for use by a visually impaired ticket agent of claim 1, further comprising:
a smart card reader in communication with the processor.

4. The mobile lottery terminal for use by a visually impaired ticket agent of claim 1, further comprising:
an audio output device in communication with the processor and configured to produce a plurality of distinct sounds.

5. The mobile lottery terminal for use by a visually impaired ticket agent of claim 4, wherein
a key of the keypad is uniquely associated with a respective one of the plurality of distinct sounds, and
the audio output device is configured, in response to the activation of the key of the keypad, to produce the respective one of the plurality of distinct sounds with which the key is uniquely associated.

6. The mobile lottery terminal for use by a visually impaired ticket agent of claim 4, wherein
the audio output device is configured to produce a unique sound in response to a successful attempt to input customer information using the customer input device.

7. The mobile lottery terminal for use by a visually impaired ticket agent of claim 4, wherein
the audio output device is configured to produce a unique sound in response to an unsuccessful attempt to input customer information using the customer input device.

8. The mobile lottery terminal for use by a visually impaired ticket agent of claim 1, wherein
the lottery ticket printer is configured to print a lottery ticket including the customer-selected lottery number.

9. A mobile lottery terminal, comprising:
a processor,
a keypad in communication with the processor and including a plurality of keys;
a customer input device in communication with the processor and configured to receive information indicative of a lottery number selected by a ticket purchaser by reading a lottery play slip, the customer input device including a bar code scanner;
an agent input device in communication with the processor and configured to receive input from a ticket;
a lottery ticket printer in communication with the processor;
a wireless communication input-output device in communication with the processor and configured to allow wireless communication between the mobile lottery terminal and a central lottery server; and
a housing dimensioned to be held in one hand, the housing containing the processor and the lottery ticket printer and retaining the agent input device, wherein the customer information input device is at least one of: retained by the housing, or attached to the housing.

10. The mobile lottery terminal of claim 9, wherein the housing retains the customer input device.

11. The mobile lottery terminal of claim 9, wherein
the ticket printer is configured to print a lottery ticket including the lottery number selected by the ticket purchaser.

12. The mobile lottery terminal of claim 9, further comprising:
a display in communication with the processor.

13. The mobile lottery terminal of claim 12, wherein the display is configured to display prompts to the ticket agent.

14. The mobile lottery terminal of claim 9, further comprising:
an audio output device.

15. The mobile lottery terminal of claim 14, further comprising:
a voice synthesizer configured to produce voice prompts with the audio output device.

16. The mobile lottery terminal of claim 15, wherein the voice synthesizer is part of the processor.

17. The mobile lottery terminal of claim 15, wherein the voice synthesizer is part of the audio output device.

18. The mobile lottery terminal of claim 14, wherein the audio output device comprises an earphone.

19. The mobile lottery terminal of claim 14, wherein the agent input device includes a keypad having a plurality of keys, and
the audio output device is configured to produce a set of distinct sounds respectively associated with one of the plurality of keys, each sound produced in response to the activation of the respectively associated one of the plurality of keys.

20. The mobile lottery terminal of claim 9, wherein the wireless communication input-output device supports the GPRS protocol.

21. The mobile lottery terminal of claim 9, wherein the wireless communication input-output device supports GSM protocol.

22. The mobile lottery terminal of claim 9, wherein the wireless communication input-output device is configured to use a second backup wireless communication network when a first primary wireless communication network is unavailable.

23. The mobile lottery terminal of claim 9, further comprising:
an attachment device secured to the housing and configured to allow the mobile lottery terminal to be transported by a person in a hands-free manner.

24. The mobile lottery terminal of claim 9, wherein the housing has dimensions less than or equal to 10 cm by 21 cm by 5 cm.

25. The mobile lottery terminal of claim 9, further comprising:
a magnetic stripe card reader in communication with the processor.

26. The mobile lottery terminal of claim 9, further comprising:
a smart card reader in communication with the processor.

27. The mobile lottery terminal of claim 9, further comprising:
a means for determining the geographic location of the mobile lottery terminal.

28. The mobile lottery terminal of claim 27, wherein the means for determining is a GPS receiver.

29. The mobile lottery terminal of claim 9, further comprising
an alarm means for reporting an emergency condition to a central server.

30. The mobile lottery terminal of claim 9, further comprising:
a security device configured to produce a digital signature.

31. The mobile lottery terminal of claim 30, wherein
the digital signature is included in transaction processing information sent by the mobile lottery terminal toward a central lottery server.

32. A mobile lottery terminal for use by a visually impaired ticket agent, comprising:
a processor;

a keypad in communication with the processor, the keypad including a plurality of keys which are tactilely distinct, the keypad configured to provide inputs to the processor from the ticket agent;

a lottery play slip reader including a bar code scanner;

an audio output device in communication with the processor;

a wireless communication input-output device in communication with the processor and configured to provide wireless communications between the mobile lottery terminal and a central lottery server;

a lottery ticket printer in communication with the processor and configured to print lottery tickets including user-selected lottery numbers; and a housing dimensioned to be held in one hand, the housing containing the processor and retaining the keypad, wherein the lottery play slip reader is at least one of: retained by the housing, or attached to the housing.

33. The lottery terminal for use by a visually impaired ticket agent of claim 32, wherein the audio output device is configured to produce a set of distinct sounds, each of the set of distinct sounds respectively associated with one of the plurality of keys and configured to be produced by the audio output device in response to the activation of the respectively associated one of the plurality of keys.

34. The lottery terminal of claim 32, wherein the audio output device is configured to produce voice prompts directing the operation of the terminal by the ticket agent.

35. The lottery terminal of claim 32, further comprising:

a customer information input device configured to receive information indicative of customer-selected lottery numbers.

36. The lottery terminal of claim 35, wherein the audio output device is configured to produce a distinct sound indicative of the successful receipt of the information indicative of customer-selected lottery numbers.

37. The lottery terminal of claim 35, wherein the audio output device is further configured to produce a distinct sound indicative of an unsuccessful attempt to input customer-selected lottery numbers.

38. A lottery system, comprising:

a central lottery server; and a plurality of mobile lottery terminals further comprising
an input device including a bar code scanner, the input device configured to receive a customer-selected lottery number by reading a lottery play slip,
a keypad in communication with the processor and including a plurality of keys,
a printer configured to printer lottery tickets including the customer-selected lottery number,
a wireless communications input-output device configured to provide communications between the mobile lottery terminals and the central lottery server including transmission of the customer-selected lottery number from the mobile lottery terminal to the central server; and
a housing dimensioned to be held in one hand, wherein each of the input device and the wireless communications input-output device is at least one of: retained by the housing, or attached to the housing.

39. A mobile lottery terminal comprising:

a processor;

a keypad in communication with the processor and having a plurality of keys, at least a subset of the keys including Braille identifiers;

an input device configured to receive information indicative of a customer-selected lottery number by reading a lottery play slip, said input device including at least one of a smart card reader, a bar code scanner, and a magnetic stripe card reader;

a wireless network input-output device in communication with the processor and configured to send a customer-selected lottery number toward a central lottery sewer via a wireless network;

a display in communication with the processor;

an audio output device configured to produce a set of distinct tones, each of the distinct tones respectively associated with one of the keys of the keypad and produced by the audio output device in response to the activation of the respectively associated key;

a printer in communication with the processor and configured to print a lottery ticket including a customer-selected lottery number; and a housing dimensioned to be held in one hand, the housing containing the processor and retaining the keypad, wherein the input device is at least one of: retained by the housing, or attached to the housing.

40. A method of vending a lottery ticket, comprising:

receiving a request to purchase a lottery ticket at a mobile lottery terminal having
an input device including a bar code scanner, the input device configured to read information from a lottery play slip,
a keypad in communication with the processor and including a plurality of keys,
a printer configured to print a lottery ticket,
a wireless input-output device configured to provide a wireless connection with a central lottery server, and
a housing dimensioned to be held in one hand, wherein each of the input device, printer, and wireless input-output device is at least one of: retained by the housing, or attached to the housing;

receiving information indicative of a customer-selected lottery number by reading the information from a lottery play slip with the input device at the mobile lottery terminal;

transmitting the customer-selected lottery number from the mobile lottery terminal toward a central lottery server via a wireless connection with the wireless input-output device;

printing a lottery ticket at the mobile lottery terminal with the lottery ticket printer, the lottery ticket including the customer-selected lottery number.

41. The method of vending a lottery ticket of claim 40, further comprising:

storing the customer-selected lottery number in the central server;

associating a unique authentication code with the customer-selected lottery number; and transmitting the unique authentication code to the lottery terminal.

42. The method of vending a lottery ticket of claim 41, further comprising:

printing the unique authentication code on the lottery ticket.

43. The method of vending a lottery ticket of claim 40, further comprising:

transmitting a digital signature uniquely associated with the mobile lottery terminal toward the central lottery sewer via a wireless network.

* * * * *

UNITED STATES PATENT AND TRADEMARK OFFICE
CERTIFICATE OF CORRECTION

PATENT NO. : 7,590,950 B2  Page 1 of 1
APPLICATION NO. : 10/453772
DATED : September 15, 2009
INVENTOR(S) : Collins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Twenty-first Day of September, 2010

David J. Kappos
*Director of the United States Patent and Trademark Office*